United States Patent [19]
Satzler

[11] Patent Number: 5,971,082
[45] Date of Patent: Oct. 26, 1999

[54] HITCH ASSEMBLY WITH VARIABLE PIVOT POINT

[75] Inventor: Ronald L. Satzler, Princeville, Ill.

[73] Assignee: Caterpillar Inc., Peoria, Ill.

[21] Appl. No.: 08/939,260

[22] Filed: Sep. 29, 1997

[51] Int. Cl.⁶ .................................................. A01B 59/00
[52] U.S. Cl. ........................ 172/439; 172/446; 172/679
[58] Field of Search ................................... 172/439, 443, 172/446, 449, 677, 679

[56] References Cited

U.S. PATENT DOCUMENTS

| | | | |
|---|---|---|---|
| 2,565,337 | 8/1951 | Allan .................................... | 172/439 X |
| 2,637,257 | 5/1953 | Betz ..................................... | 172/439 X |
| 2,693,969 | 11/1954 | Simpson ................................. | 172/439 |
| 2,701,510 | 2/1955 | Algelt .................................. | 172/439 X |
| 2,731,898 | 1/1956 | Frevik et al. . | |
| 2,765,723 | 10/1956 | Clarke et al. . | |
| 3,015,499 | 1/1962 | Van Der Lely et al. ........... | 172/677 X |
| 3,031,208 | 4/1962 | Abbott ................................... | 172/439 |
| 3,065,977 | 11/1962 | Virtue et al. ............................ | 172/439 |
| 3,378,279 | 4/1968 | Jacobs .................................. | 172/439 X |
| 3,704,534 | 12/1972 | Preu .................................... | 172/677 X |
| 3,795,415 | 3/1974 | Koch et al. ......................... | 172/439 X |
| 4,216,975 | 8/1980 | Schafer .................................. | 172/439 |

FOREIGN PATENT DOCUMENTS

| | | |
|---|---|---|
| 0502762A1 | 9/1992 | European Pat. Off. . |
| 1318857 | 5/1963 | France . |
| 1058294 | 5/1959 | Germany . |

*Primary Examiner*—Christopher J. Novosad
*Attorney, Agent, or Firm*—Steven G. Kibby

[57] ABSTRACT

A hitch module for a track-type work machine in which the pivot point of a towed work implement is varied by selectively positioning a pair of links joining the work machine to a hitch frame.

14 Claims, 6 Drawing Sheets

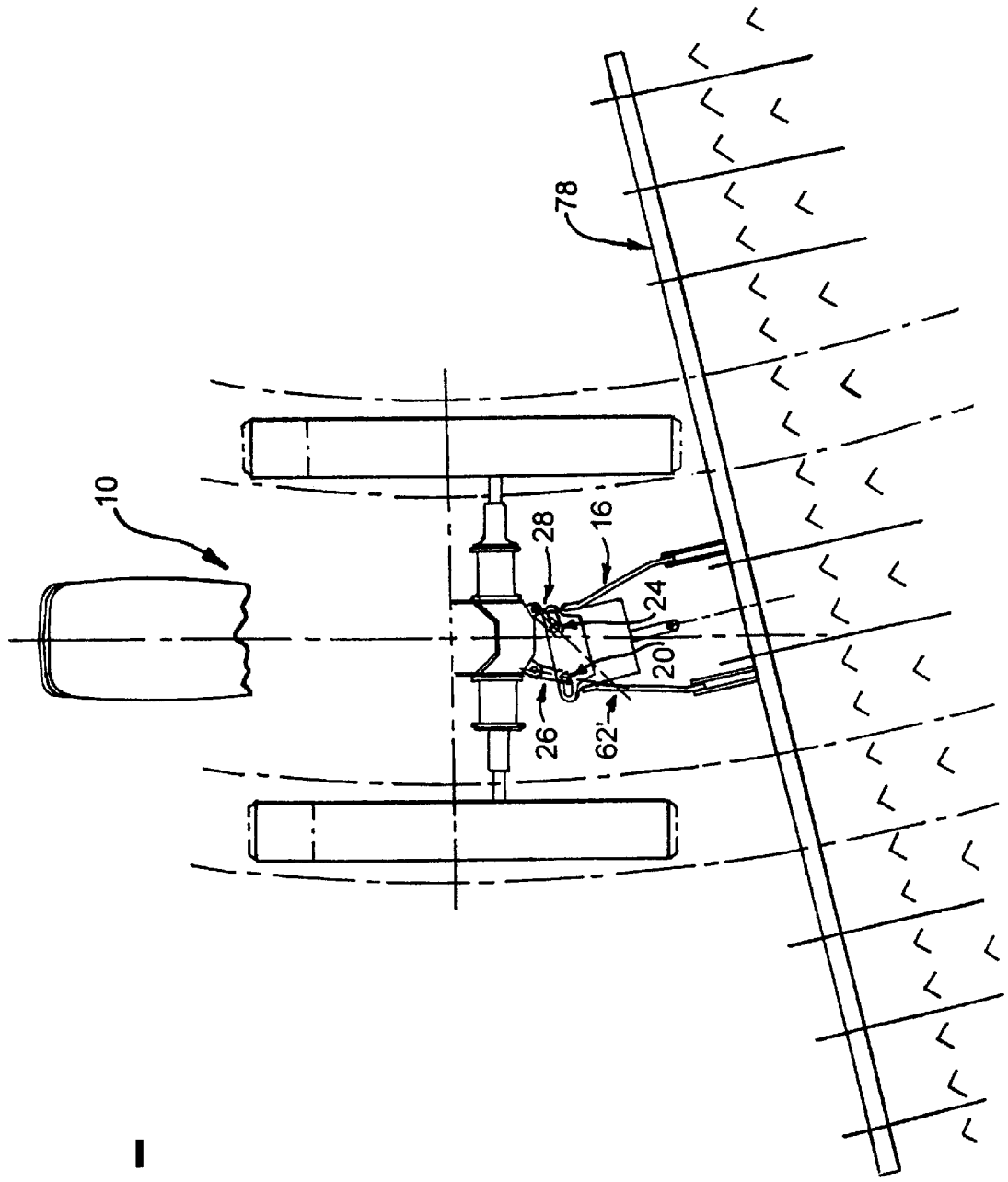

HITCH ASSEMBLY WITH VARIABLE PIVOT POINT

TECHNICAL FIELD

This invention relates generally to a hitch for a track-type work machine and in particular to a hitch module for shifting the pivot point of a towed work implement.

BACKGROUND ART

On track-type work machines such as belted agricultural tractors, it has long been desired when pulling certain heavy tillage work implements, such as chisel plows and field cultivators, to turn or pivot these towed implements about a point at or in front of the pivot center of the tractor. On the other hand, it has also been a desire to pivot other work implements, such as row crop equipment, about a point approximately two feet behind the centerline of the track driver of the tractor.

The prior art in wheeled tractors is replete with variations of drawbar-related devices for hitch articulation and manipulation, but such art does not necessarily transfer to track-type machines. For example, one characteristic of track-type machines not found in wheeled machines is the tendency to push a towed work implement to an opposing side as the track-type machine turns. This characteristic is often undesirable on agricultural work machines, especially in the row crop applications where accurate locating of the towed implement is important. On the other hand, having an implement pivot point near the work machine pivot point is desirable where high pulling forces are required. What has been desired then, is a hitch particularly for a track-type machine, with a variable pivot point.

The present invention is directed to overcoming one or more of the problems set forth above.

DISCLOSURE OF THE INVENTION

In one aspect of the present invention, a hitch assembly for a work machine having a front end includes a frame, a first structural element constituting one of the frame and work machine, and a second structural element constituting the other of the frame and work machine and having first, second, third and fourth pivot locations. Additionally, the hitch assembly has first and second links each having a first and second end for linking the first structural element to the second structural element. The first and second links are pivotally attached at their first ends to the first structural element and are attachable at their second ends to the second structural element at a selected one the first and third pivot locations, respectively, and at a selected one of the second and fourth pivot locations, respectively. The first and second links define an implement pivot point relatively nearer the machine's front end when the first and second links are respectively attached at the first and third pivot locations. The links define an implement pivot point relatively further from the machine's front end when the first and second links are respectively attached at the second and fourth pivot locations.

In another aspect of the present invention, a hitch assembly for a work machine includes a frame having a frame longitudinal axis, a first slot on one side of the frame axis and a second slot on the other side of the frame axis. A first link has opposite ends and is pivotally mountable at one end at preselected positions in the first slot, and is pivotally mountable at the other end on the work machine. A second link also has opposite ends and is pivotally mountable at one end at preselected positions in the second slot, and is pivotally mountable at the other end on the work machine.

In still another aspect of the present invention, a hitch assembly for a work machine includes a first fastener at one end of the first link, the first fastener retaining the first link at a stationary position relative to the first slot. Similarly, a second fastener is at one end of the second link and it retains the second link at a stationary position relative to the second slot. A pair of draft arms is also included, one draft arm being located on one side of the frame longitudinal axis and the other draft arm being located on the other side of the frame axis. A center member extends along the frame longitudinal axis and is attached to the frame between the pair of draft arms.

BRIEF DESCRIPTION OF THE DRAWINGS

FIG. 7 is a diagrammatic top view of a work machine with a hitch assembly configured for threepoint hitch operation.

BEST MODE FOR CARRYING OUT THE INVENTION

Figure 1:
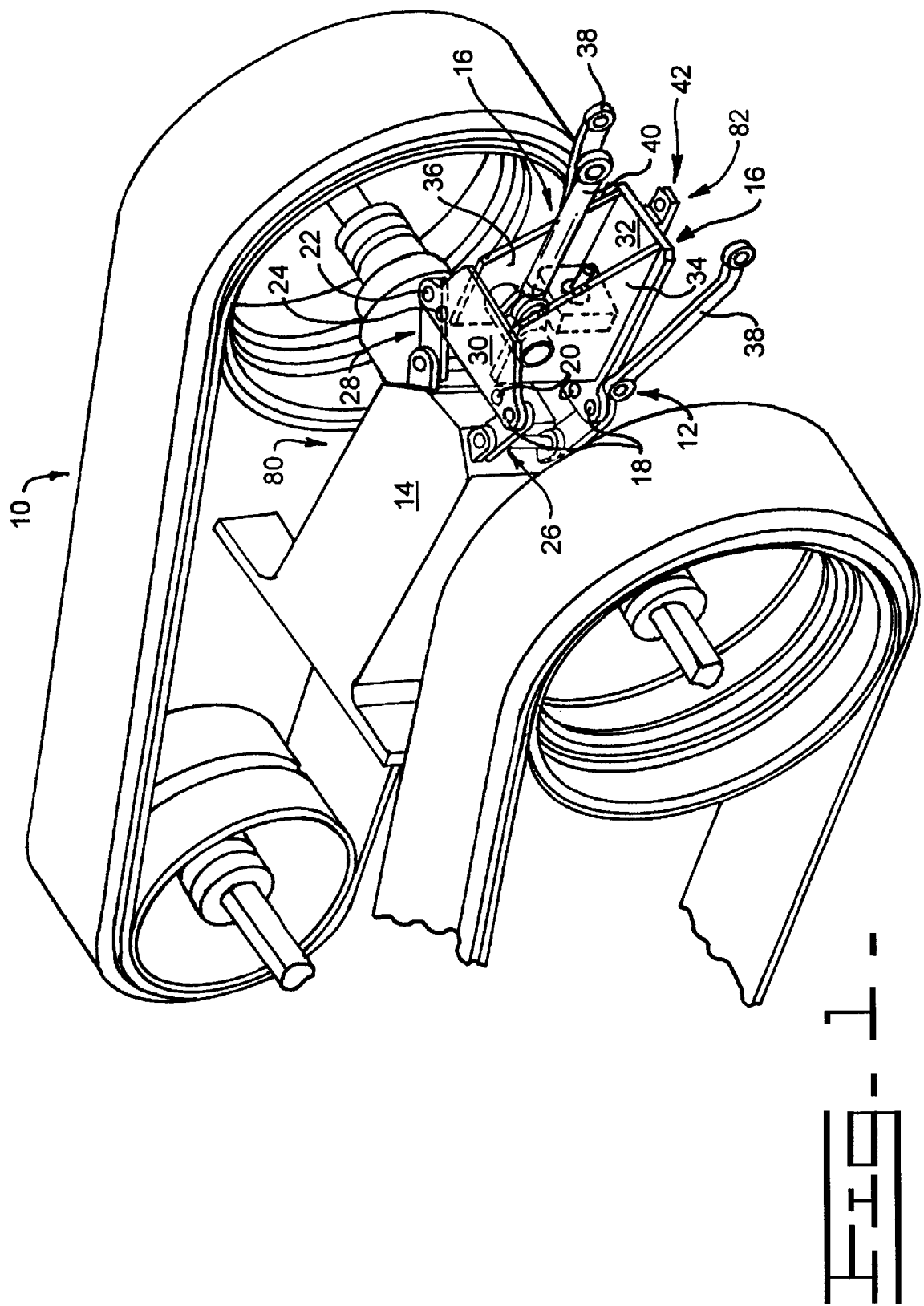
FIG. 1 is a diagrammatic perspective view of a portion of a work machine with a hitch assembly constructed in accordance with the present invention and configured for drawbar, or forward pivot, operation.
Figure 2:
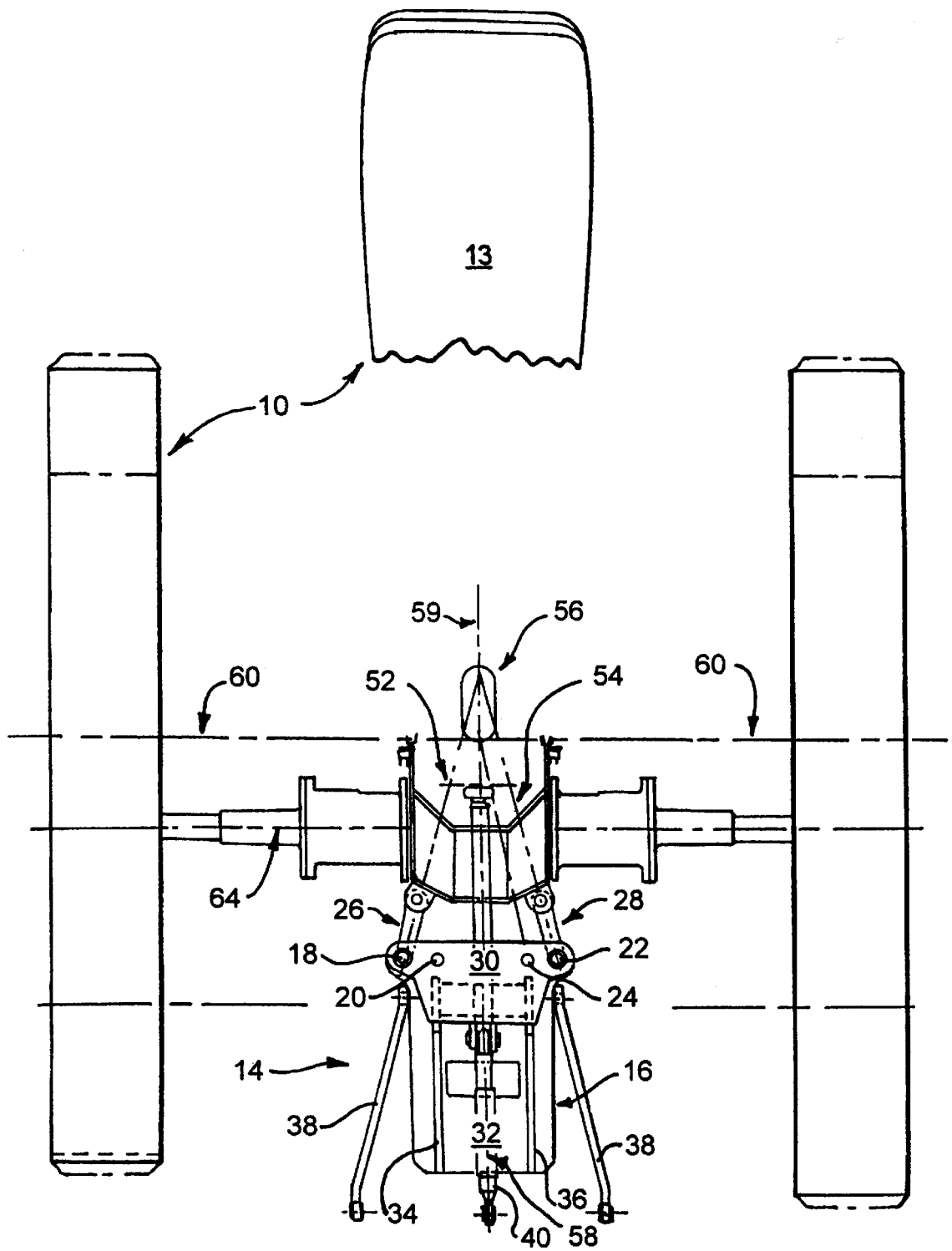
FIG. 2 is a diagrammatic partial top view of a work machine with a hitch assembly configured for drawbar operation.
Figure 4:
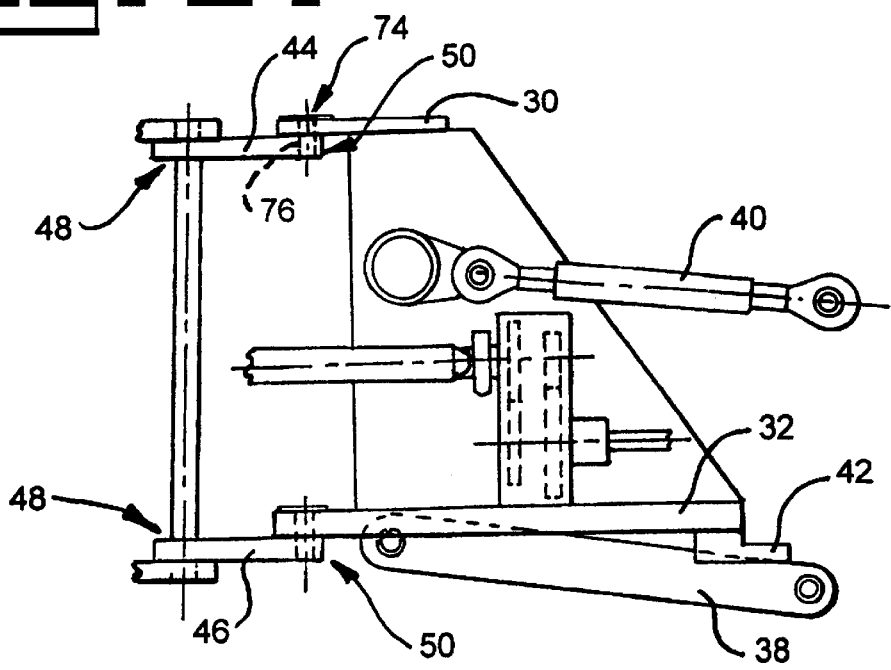
FIG. 4 is a diagrammatic side view taken along line 4—4 of the hitch assembly of FIG. 3.

Referring to FIGS. 1, 2 and 4, a work machine 10 such as a belted agricultural tractor, has a front end 13, a rear end 14, a first structural element 80, a second structural element 82 and a hitch assembly 12. As shown in this embodiment, the first structural element 80 constitutes the rear end 14 of work machine 10. The hitch assembly 12 includes a frame 16, first link 26 and second link 28. As shown in this embodiment, second structural element 82 constitutes frame 16. Frame 16 has frame longitudinal axis 58, upper member 30, lower member 32 and first and second vertical members 34,36. The members 30,32,34,36 fit together in a box-like fashion and provide a stiff structure for a three point hitch. As shown, a typical three point hitch includes lower draft arms 38,38 located on either side of frame longitudinal axis 58 and connected at either side of frame 16, and center member 40 between the draft arms 38,38. Center member 40 extends along the axis 58. A drawbar member 42 is attached to frame 16 on lower member 32.

First and second links 26,28 are shaped similar to each other and are on laterally-opposing sides of frame longitudinal axis 58. The links 26,28 join frame 16 to work machine 10 such that frame 16 pivots relative to work machine 10. Each link 26,28 preferably has an upper and lower arm 44,46 with first end 48 and opposite second end 50. Each first end 48 is pivotally mounted to work machine 10. Each second end 50 is pivotally attached to frame 16 with said second ends of said upper arms 44 being attached in the embodiment shown at upper member 30 and said pivot ends of said lower arm 46 being attached at a spaced apart location as shown at lower member 32. On upper member 30 are first, second, third and fourth pivot locations 18,20,22,24. Second end 50 of the upper arm of the first link 26 is positionable (pivotally connectable) at either first pivot location 18 or second pivot location 20 whereas second end 50 of the upper arm of second link 28 is positionable (pivotally connectable) at either third pivot location 22 or fourth pivot location 24. On lower member 32 are corresponding pivot locations for the lower arms 46. Said lower pivot locations will not be discussed in detail as it is to be understood they are similar to the pivot locations 18,20,22,24 in upper member 30. While not shown, it is to be understood that frame 16 may constitute first structural element 80 and that work machine 10 may constitute second structural element 82, with the pivot locations 18,20,22,24 being located at the rear portion 14 and the first and second links 26,28 being pivotally attached to the frame 16.

Figure 3:
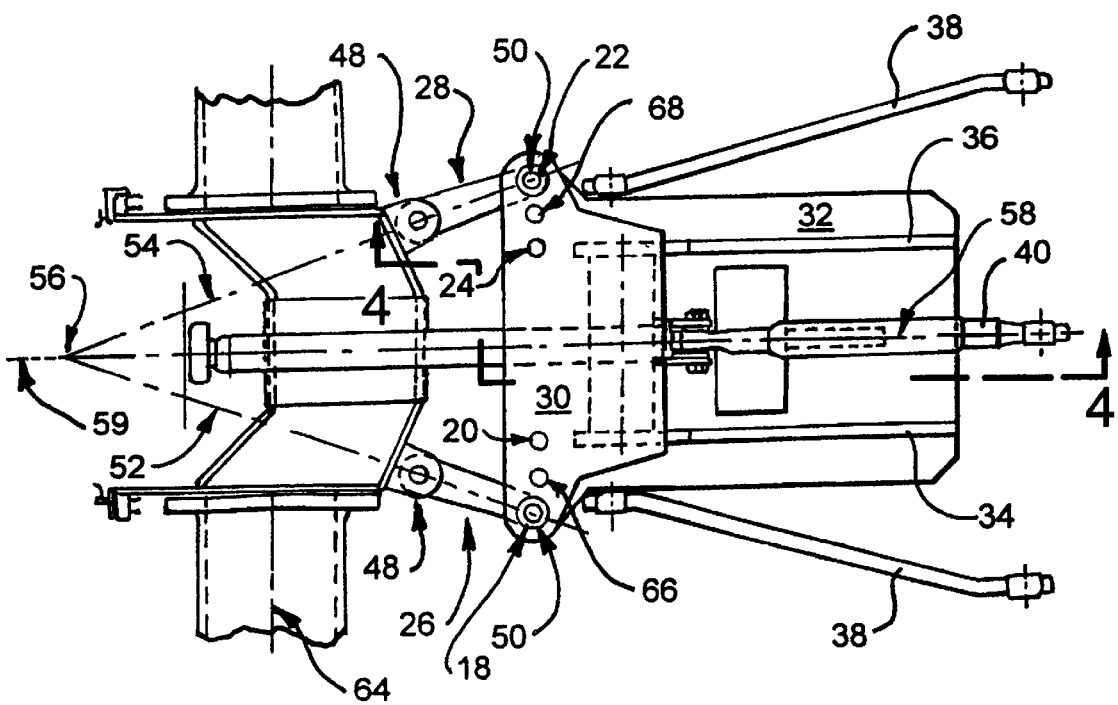
FIG. 3 is a top view of the hitch assembly from FIG. 2 with additional locating holes in the top frame structure.

Referring to FIG. 3, first link axis 52 is defined by a bisecting line drawn on first link 26 extending through first end 48 and second end 50. Second link axis 54 is defined by a bisecting line drawn on second link 28 through first end 48 and second end 50. With reference to a work implement 78 as shown in FIG. 7, first link axis 52 and second link axis 54 intersect at implement forward pivot point 56 when first link 26 is at first pivot location 18 and second link 28 is at third pivot location 22 and the second ends 50,50 are equally spaced about work machine longitudinal axis 59. Implement forward pivot point 56 is at or forward of the first ends 48,48 and is advantageously at or forward of work machine pivot center 60.

Figure 5:
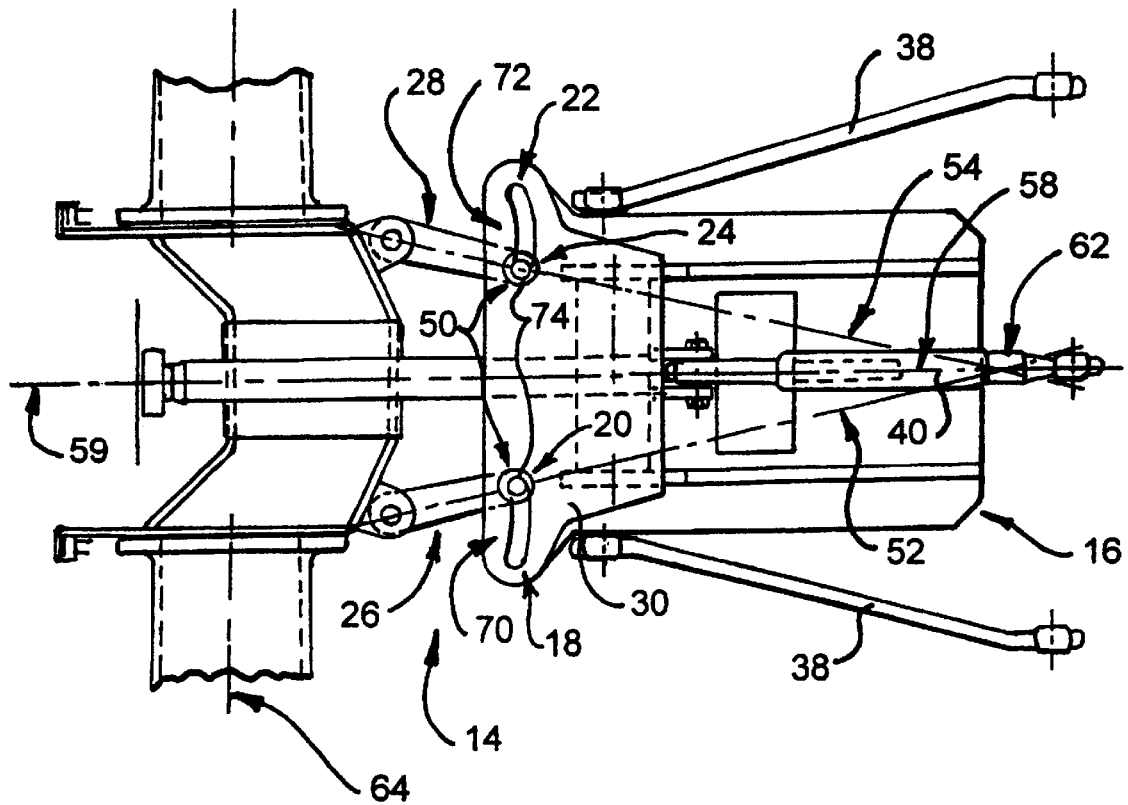
FIG. 5 is a top view of a hitch assembly with arcuate slots configured for three-point hitch, or rearward pivot, operation.

Referring to the embodiment illustrated in FIG. 5, first arcuate slot 70 and second arcuate slot 72 are on either side of frame longitudinal axis 58 and respectively encompass the first and second, and the third and fourth pivot locations 18,20,22,24. While not specifically shown, the slots 70,72 each include first and second slot elements, the first slot elements being in upper member 30 and the second slot elements being in lower member 32. The upper arms 44 extend at second ends 50 into the first elements of slots 70,72 while the lower arms 46, having corresponding second ends (not shown), extend to the second elements of slots 70,72. First link axis 52 and second link axis 54 intersect at implement rearward pivot point 62 when first link 26 is at second pivot location 20 and second link 28 is at fourth pivot location 24 and the second ends 50,50 are equally spaced about work machine longitudinal axis 59. Implement rearward pivot point 62 is behind track driver or axis centerline 64 and first and second links 26,28. It is to be understood that while arcuate slots are shown, non-arcuate slots (not shown) may also be employed. Each arcuate slot 70,72 is advantageously shaped about radii having centers (not shown) forward of the slots, toward work machine 10. While not shown, it is to be understood that frame 16 may constitute the first structural element 80 and that rear portion 14 may constitute the second structural element 82, with the arcuate slots 70,72 being located on the rear portion 14 of the work machine 10 and the first and second links 26,28 being pivotally attached to the frame 16.

Referring to the embodiment illustrated in FIG. 3, additional pivot locations such as fifth pivot location 66 may be placed between first and second pivot locations 18,20. Additional pivot locations such as sixth pivot location 68 may be placed between third and fourth pivot locations 22,24. Referring additionally to FIG. 5 where the slots 70,72 provide numerous pivot locations, such additional pivot locations facilitate selectively locating the first and second links 26,28 on frame 16 for varying the implement forward and rearward pivot points 56,62. While not shown, it is to be understood that frame 16 may constitute the first structural element 80 and that rear portion 14 of work machine 10 may constitute the second structural element 82, with first, second, third, fourth, fifth and sixth pivot locations 18,20, 22,24,66,68 being located on the rear portion 14 and first and second links 26,28 being pivotally attached to the frame 16.

Referring to FIGS. 4 and 5, second ends 50,50 of first and second links 26,28 are retained in a stationary position at their respective first, second, third and fourth pivot locations 18,20,22,24 relative to frame 16 by fasteners 74,74. Mounted at each end 50 is stud 76, which extends into the pivot locations or slots on frame upper member 30 through a rotatable bushing member (not shown). The bushing member allows the stud 76 to rotate while the fastener 74 retains the end 50 of upper arm 44 in an operable relationship with the frame upper member 30. While not shown, it is to be understood that corresponding elements on first and second links 26,28 retain lower arm 46 in an operable relationship with the frame lower member 32.

Figure 6:
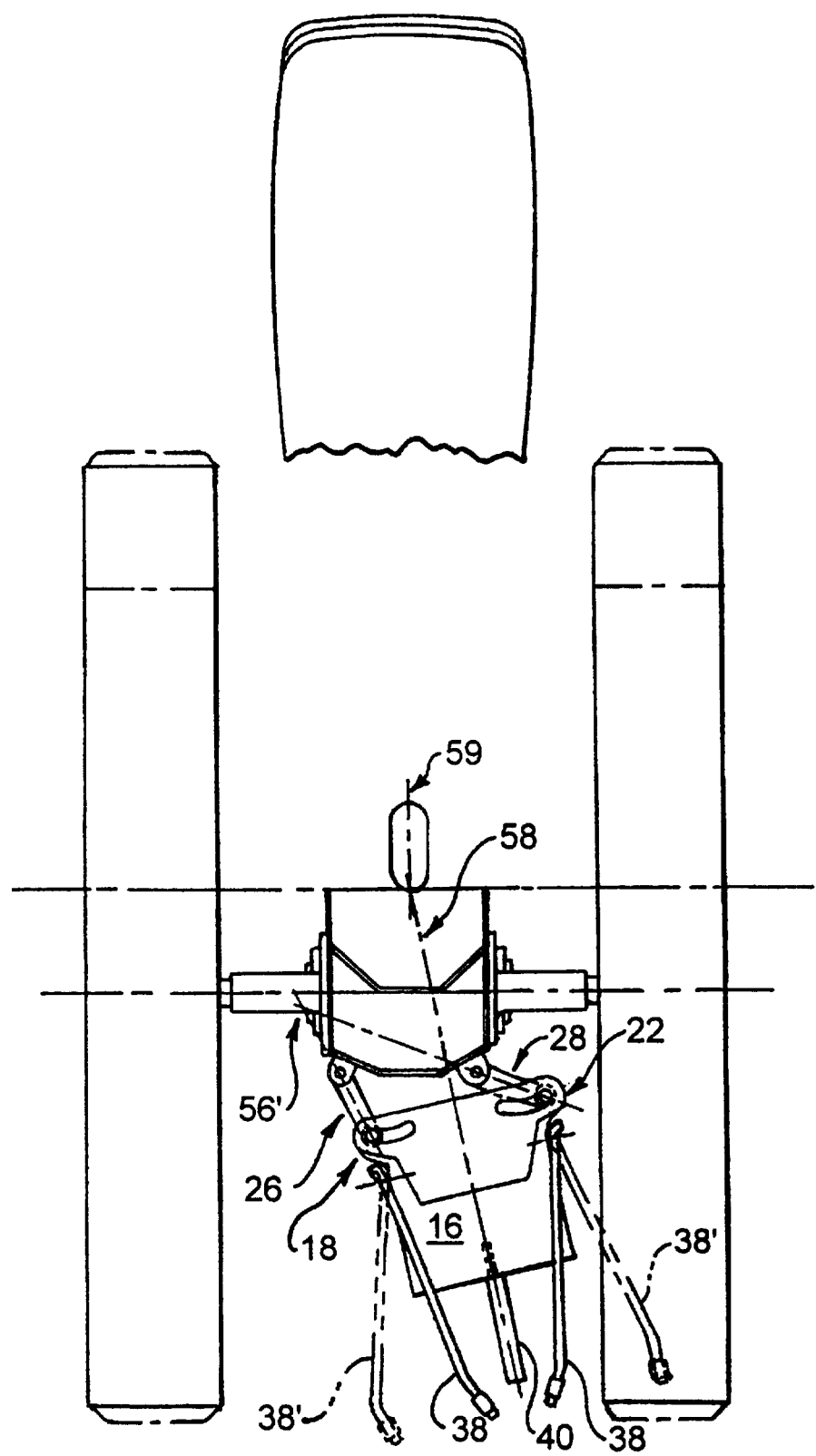
FIG. 6 is a diagrammatic top view of a work machine having narrow gage tracks with a hitch assembly configured for drawbar operation.

As shown in FIG. 6, the draft arms 38 may be articulated toward each other with respect to the frame longitudinal axis 58 to accommodate the towing requirements of various work implements and to prevent undesirable contact with the rotating tracks of tracktype work machine 10. Draft arms 38 move from an outer position, designated as draft arms 38' in FIG. 6 to an inner position. Draft arms 38 pivot up and down relative to frame 16 for attaching to a work implement. While not specifically shown, draft arms 38 may be articulated by manual or powered means, as is understood by those skilled in the art.

Industrial Applicability

As seen in FIG. 7, tractor 10 is towing work implement 78 in three point hitch operating mode, that is, the lower draft arms and center member are pulling the work implement 78. Furthermore, the towing is being conducted with first and second links 26,28 located at their respective innermost positions on frame 16, the positions corresponding to the second and fourth pivot locations 20,24. In this configuration, the implement pivot point is behind first and second links 26,28 at implement rearward pivot point 62'. An implement rearward pivot point 62' is preferred over an implement forward pivot point in certain three-point operating modes because the towed implement is more precisely controlled when turning.

Referring again to FIG. 6, with the first and second links 26,28 located at their respective outermost positions on frame 16, the positions corresponding to the first and third pivot locations 18,22, the towed implement pivot point is in front of the links at an implement forward pivot point 56'. This configuration is best for drawbar operating mode because the towed implement receives the advantage of additional stability and weight from the work machine. It is to be noted that in either the drawbar or three point hitch operating mode, the hitch may be configured for free-pivoting or controlled pivoting operation.

Other aspects, objects and advantages of this invention can be obtained from a study of the drawings, the disclosure, and the appended claims.

I claim:

1. A hitch assembly for a work machine having a front end, comprising:

a frame;

a first structural element constituting one of said work machine and said frame;

a second structural element constituting the other of said work machine and said frame and having first, second, third and fourth pivot locations;

first and second links each having a first and a second end, the first end of said first and second links being pivotally attached to said first structural element, the second end of said first and second links being attachable to said second structural element at a selected one of the first and third pivot locations, respectively, and at a selected one of the second and fourth pivot locations, respectively;

said first and second links defining a pivot point for towing an implement relatively nearer the machine's front end when said first and second links are respectively attached at said first and third pivot locations, said links defining a pivot point for towing an implement relatively further from the machine's front end when said first and second links are respectively attached at said second and fourth pivot locations; and a pair of draft arms, one said draft arm being located on a side of said frame and being connected to said frame, and the other draft arm being located on an opposite side of said frame and being connected to the other side of said frame.

2. The hitch assembly as set forth in claim 1 further comprising a plurality of pivot locations between said first and second pivot locations and between said third and fourth pivot locations for selectively locating said first and second links on said second structural element for varying the implement pivot point.

3. The hitch assembly as set forth in claim 1 further comprising first and second slots on said second structural element, said first and second pivot locations comprising a portion of said first slot, said third and fourth pivot locations comprising a portion of said second slot.

4. A hitch assembly for a work machine, comprising:

a frame having a frame longitudinal axis, a first slot on one side of said axis and a second slot on the other side of said axis;

a first link having first and second ends and being pivotally mountable at said second end of said first link at preselected positions in said first slot, and being pivotally mountable at said first end of said first link on the work machine;

a second link having first and second ends and being pivotally mountable at said second end of said second link at preselected positions in said second slot, and being pivotally mountable at said first end of said second link on the work machine; and a pair of draft arms, one said draft arm being pivotally connected to said frame on a side of said frame longitudinal axis, and the other draft arm being pivotally connected to said frame on an opposite side of said frame longitudinal axis.

5. The hitch assembly of claim 4, further comprising:

a first fastener at said second end of said first link, said first fastener retaining said second end at a stationary position relative to said first slot; and a second fastener at said second end of said second link, said second fastener retaining said second end at a stationary position relative to said second slot.

6. The hitch assembly of claim 4, further comprising:

a center member attached to said frame between said pair of draft arms and extending along said frame longitudinal axis.

7. The hitch assembly as set forth in claim 6 wherein said draft arms articulate toward each other with respect to said frame longitudinal axis.

8. The hitch assembly as set forth in claim 6 wherein said draft arms pivot up and down relative to said frame for attaching to a work implement.

9. The hitch assembly as set forth in claim 4 wherein said second end of each first and second link is positionable within said first and second slots such that, when the second ends are positioned equally spaced away from said frame longitudinal axis, an intersection of lines drawn through the first and second ends of each link is a point forward of the first ends of said links.

10. The hitch assembly as set forth in claim 4 wherein said second end of each first and second link is positionable within said first and second slots such that, when the second ends are positioned equally spaced towards said frame longitudinal axis an intersection of lines drawn through the first and second ends of each link is a point behind the second ends of said links.

11. The hitch assembly as set forth in claim 4 wherein said first and second slots are shaped about radii having centers forward of said slots.

12. A hitch assembly for a work machine, comprising:

a frame having a frame longitudinal axis, a first arcuate slot on one side of said axis and a second arcuate slot on the other side of said axis;

a first link having opposite ends and being pivotally mountable at one said end at preselected positions in said first arcuate slot, and being pivotally mountable at the other said end on the work machine;

a second link having opposite ends and being pivotally mountable at one said end at preselected positions in said second arcuate slot, and being pivotally mountable at the other said end on the work machine;

a first fastener at one said end of said first link, said first fastener retaining said first link at a stationary position relative to said first slot;

a second fastener at one said end of said second link, said second fastener retaining said second link at a stationary position relative to said second slot; a pair of draft arms, one said draft arm being located on one side of said frame longitudinal axis and the other draft arm being located on the other side of said frame longitudinal axis; and a center member attached to said frame between said pair of draft arms and extending along said frame longitudinal axis.

13. The hitch assembly as set forth in claim 12 wherein each of said first and second links has an upper and lower arm each having first and second ends, said first ends of each of said related upper and lower arms being pivotally connected to said work machine at spaced apart locations.

14. The hitch assembly as set forth in claim 13 wherein said second ends of each of said upper and lower arms are pivotally connectable in a respective one of said first and second slots positioned in the upper and lower members of the frame.

* * * * *